May 29, 1928.
A. O. CODNEY
1,671,407
CONNECTER FOR USE IN CHARGING BATTERIES
Filed Dec. 18, 1925
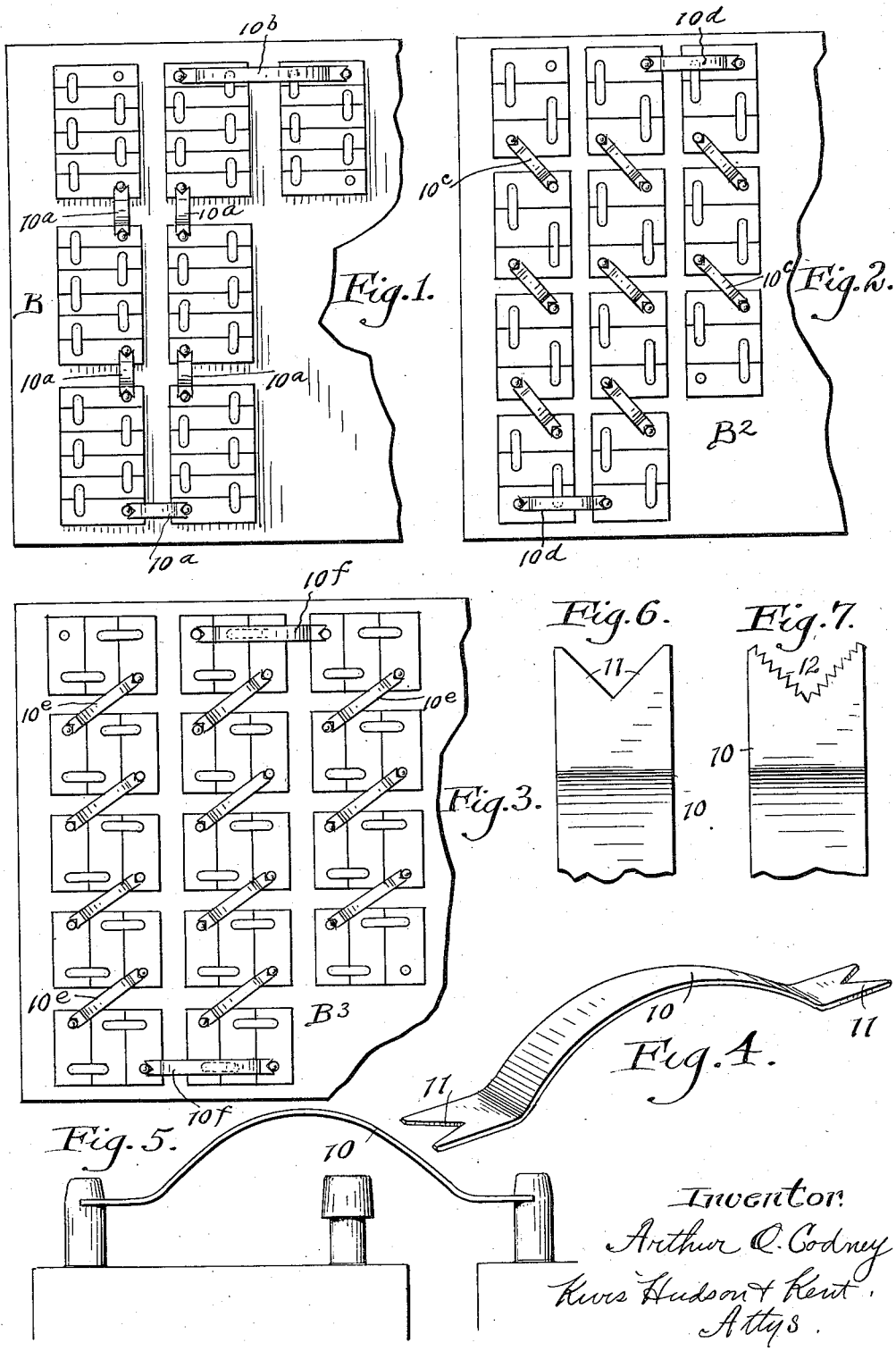

Patented May 29, 1928.

1,671,407

UNITED STATES PATENT OFFICE.

ARTHUR O. CODNEY, OF CLEVELAND, OHIO, ASSIGNOR TO WILLARD STORAGE BATTERY COMPANY, OF CLEVELAND, OHIO, A CORPORATION OF WEST VIRGINIA.

CONNECTER FOR USE IN CHARGING BATTERIES.

Application filed December 18, 1925. Serial No. 76,175.

This invention relates to a battery connecter and to a system of connecting batteries when they are grouped together and are adapted to be serially connected across a charging circuit.

The invention has particular utility in the plant of a storage battery manufacturer and in service stations where batteries are charged in quantities or numbers from a charging circuit of fairly high voltage, and it has for its chief object to reduce the expense and also the time required in making the necessary connections between batteries.

A further object is to provide a connecter which is simple in construction, durable, and which can be very readily applied, and when applied between the posts of adjoining batteries will by its own elasticity be retained in place and make low resistance connections with the batteries suitable for charging purposes.

The invention may be briefly summarized as consisting in certain novel details of construction, and combinations and arrangements of parts which will be described in the specification and set forth in the appended claims.

In the accompanying sheet of drawings wherein I have illustrated a connecter embodying the invention, and several ways in which the batteries may be grouped so that they may be serially connected by connecters of this type, Figs. 1, 2 and 3 are plan views showing several different groupings of batteries as they may be arranged on a table to be connected by my improved connecters; Fig. 4 is a perspective view of one of the connecters involving my invention, the same being shown on a considerably larger scale than in Figs. 1 to 3; Fig. 5 shows the top portions of two adjacent batteries connected together by my improved connecter; Fig. 6 shows one end of the connecter as it is preferably formed; and Fig. 7 is a similar view showing a slight modification.

In Figs. 1 to 3 I have shown how my improved connecter is generally employed in connecting together a group of batteries on a charging table. They can be arranged end to end in rows as illustrated by the batteries "B" in Fig. 1, and "B'" in Fig. 2, or can be arranged side by side in rows as with the batteries "B³" in Fig. 3. To conserve space they will generally be placed against one another, end to end, or side by side, or both, but for convenience of illustration are here shown slightly apart. In Fig. 1 I have illustrated a series of six-cell or twelve-volt batteries, and in Figs. 2 and 3 three-cell or six-volt batteries.

In charging a group of batteries it will of course be understood that the number of batteries that can be connected in a group and charged at one time depends upon the voltage of the charging circuit and the number of cells per battery, regardless of the number of batteries employed, or the voltage thereof. The batteries are connected serially across the line, the positive and negative line connections being made in any suitable way with the positive and negative terminals respectively of the batteries at opposite ends of the group, and the batteries being connected together by connecting in different ways the positive terminal of one battery to the negative terminal of the adjoining battery. These battery to battery connections are sometimes made by means of a pair of spring clips connected together by flexible wire, and sometimes by a wire which is soldered to the terminals of the batteries, and when not soldered, otherwise fastened thereto.

It is in making the battery to battery connections that my invention finds its greatest utility, and in carrying out my invention I employ for this purpose an elastic leaf connecter 10, made out of suitable conducting material which has the right degree of elasticity, such as phosphor bronze. The connecter is in the form of a strap, preferably and generally bowed between the ends, as illustrated in Figs. 4 and 5, and at the ends so formed that the connecter will effectively engage the posts or terminals of the batteries which are to be connected together, and under the elasticity the material will make low resistance connection therewith. Generally the ends of the leaf or strap are simply notched out or made V-shaped, as indicated at 11, but the inside edges of the V may be serrated, as shown at 12. In forming the bow in a connecter the end portions for a length greater than the depth of the notches are preferably left flat, so that if the notches become worn from continued use, the ends can be re-notched since there is ample stock in the unbowed end portions for this purpose.

To connect together any two batteries it is only necessary to select a connecter of such length that the distance between battery posts is less than the distance between the notches of the connecter, and then place the ends into engagement with the posts or terminals with the connecter under tension by bowing it still further. The elasticity or tendency of the connecter to assume a more flattened condition gives the necessary pressure between the connecter and posts to form good electrical connections with both batteries.

Generally in connecting together any group of batteries, regardless of their arrangement, not more than two connecter lengths will be necessary, the arrangement shown in Fig. 1 requiring a series of short connecters, indicated at 10$^a$, and one relatively long connecter, indicated at 10$^b$. With the arrangement shown in Fig. 2, a series of diagonally disposed connecters 10$^c$ connect together the batteries in each row, and the end batteries of two adjoining rows are connected together by connecters 10$^d$ which may or may not be of the same length as the connecters 10$^c$. A similar situation prevails for the arrangement shown in Fig. 3, where the batteries of each row are connected together by diagonally disposed connecters 10$^e$, and the end batteries of two adjacent rows are connected together by somewhat longer connecters 10$^f$. Of course the batteries may be grouped differently than illustrated, and in some instances the batteries may be connected together by connecters all of the same length.

A great advantage in employing connecters of the type herein illustrated is the ease and speed with which the batteries may be connected together, as it is only necessary for the operator to snap the connecter in between the necessary terminal posts since the tension imposed in the connecter by increasing the bow or bend in placing it in position creates the necessary pressure to not only hold the connecter in place, but to make low resistance connections with both terminal posts which it engages, the weight of the batteries being always sufficient to resist the tendency of the connecter to spread them apart. Additionally the connecters are very durable, having almost indefinite life, particularly if they are lead coated so as to be substantially resistant to acid.

It might be stated in conclusion, that the connecters 10 are not only bowed while in natural condition, or under no tension, for the purpose of facilitating the application of the connecters to the batteries, but by giving them a normal bowed form the connecters will always clear such parts as vent plugs or posts and other projecting elements which may be between the two posts which the connecter is designed to engage. It should also be noted that the opposite straight ends of the connecter are of substantial length and lie substantially in the same plane. This arrangement provides a proper clearance between the terminal post and the bowed portion, thus facilitating attachment of the connecter to the post, and serves to maintain the connecter in position since the ends are always exerting pressure against the post in opposite directions but in substantially the same plane.

Having described my invention, I claim:

1. A connecter for connecting a pair of battery terminals comprising a strip of elastic conducting material having its opposite ends straight for a substantial distance and in substantial longitudinal alignment with each other and its intermediate portion normally bowed a substantial distance out of the plane of the opposite ends.

2. A connecter for connecting a pair of battery terminals comprising a strip of elastic conducting material having its opposite ends straight for a substantial distance and in substantial longitudinal alignment with each other and its intermediate portion normally bowed a substantial distance out of the plane of the opposite ends, the opposite ends of the connecter each having a longitudinally extending substantially V-shaped notch.

In testimony whereof, I hereunto affix my signature.

ARTHUR O. CODNEY.